United States Patent
Wang et al.

(10) Patent No.: US 11,521,094 B2
(45) Date of Patent: Dec. 6, 2022

(54) RULE ENGINE SYSTEM AND METHOD FOR HUMAN-MACHINE INTERACTION

(71) Applicant: Auryc, Inc., Los Altos, CA (US)

(72) Inventors: Jinlin Wang, Los Altos, CA (US);
Feng Shao, Santa Clara, CA (US);
Amod R. Setlur, Portola Valley, CA (US)

(73) Assignee: Auryc, Inc., Los Altos, CA (US)

( * ) Notice: Subject to any disclaimer, the term of this patent is extended or adjusted under 35 U.S.C. 154(b) by 1032 days.

(21) Appl. No.: 15/608,090

(22) Filed: May 30, 2017

(65) Prior Publication Data
US 2018/0348997 A1 Dec. 6, 2018

(51) Int. Cl.
*G06N 5/04* (2006.01)
*G06Q 30/02* (2012.01)
*G06F 3/0481* (2022.01)
*G06F 11/34* (2006.01)

(52) U.S. Cl.
CPC ........... *G06N 5/046* (2013.01); *G06F 3/0481* (2013.01); *G06F 11/3438* (2013.01); *G06Q 30/0241* (2013.01)

(58) Field of Classification Search
CPC ... G06F 3/0481; G06Q 30/0241; G06N 5/046
See application file for complete search history.

(56) References Cited

U.S. PATENT DOCUMENTS

| | | | | |
|---|---|---|---|---|
| 8,340,011 | B2* | 12/2012 | Kenagy | H04H 20/26 370/312 |
| 2005/0075929 | A1* | 4/2005 | Wolinsky | G06Q 30/0273 705/14.61 |
| 2005/0097008 | A1* | 5/2005 | Ehring | G06Q 30/0639 715/205 |
| 2008/0167943 | A1* | 7/2008 | O'Neil | G06Q 30/02 705/7.34 |
| 2009/0113318 | A1* | 4/2009 | Roseway | G06F 3/0481 715/762 |
| 2009/0171787 | A1* | 7/2009 | Mei | G06Q 30/0273 705/14.69 |
| 2010/0174695 | A1* | 7/2010 | Pachet | G06F 3/0481 707/705 |

(Continued)

OTHER PUBLICATIONS

Navalpakkam et al. (Mouse Tracking: Measuring and Predicting Users' Experience of Web-based Content, May 2012, pp. 2963-2972) (Year: 2012).*

*Primary Examiner* — George Giroux
(74) *Attorney, Agent, or Firm* — Dinsmore & Shohl LLP (57) ABSTRACT

A system for monitoring and stimulating user actions to contents retrieved from a network is disclosed. The system may comprise a set of configurable rules, a rules engine for applying the rules, and a server coupled to an end-user computing device and the network. The server may be configured to associate the end-user computing device to the rules engine and to at least one of the rules, determine at least one of a state of the server, an input at the server, a state of the end-user computing device, or an input at the end-user computing device each associated with at least a portion of the retrieved contents, and execute the associated at least one rule utilizing the associated rules engine to stimulate a user action from the end-user computing device.

10 Claims, 4 Drawing Sheets

(56) References Cited

U.S. PATENT DOCUMENTS

| | | | |
|---|---|---|---|
| 2010/0250348 A1* | 9/2010 | Dunbar | G06Q 30/02 |
| | | | 725/35 |
| 2011/0082755 A1* | 4/2011 | Itzhak | G06Q 30/0277 |
| | | | 705/14.69 |
| 2012/0158161 A1* | 6/2012 | Cohn | G08B 29/02 |
| | | | 700/90 |
| 2013/0124309 A1* | 5/2013 | Traasdahl | G06Q 30/02 |
| | | | 705/14.49 |
| 2014/0074588 A1* | 3/2014 | Bertsch | G06Q 30/02 |
| | | | 705/14.42 |
| 2015/0188971 A1* | 7/2015 | Yoon | H04L 65/80 |
| | | | 709/219 |
| 2015/0334433 A1* | 11/2015 | Zeigler | H04H 60/65 |
| | | | 725/35 |
| 2017/0103327 A1* | 4/2017 | Penilla | G06F 3/0484 |
| 2017/0330297 A1* | 11/2017 | Cronin | A61B 5/6802 |
| 2017/0367042 A1* | 12/2017 | Ekambaram | H04W 56/0015 |
| 2017/0372364 A1* | 12/2017 | Andreou | G06Q 30/0264 |
| 2018/0109636 A1* | 4/2018 | Hardy | H04L 67/125 |
| 2018/0247344 A1* | 8/2018 | Feng | G06Q 50/01 |

* cited by examiner

RULE ENGINE SYSTEM AND METHOD FOR HUMAN-MACHINE INTERACTION

TECHNICAL FIELD

The present disclosure relates generally to human-machine interaction, and more particularly, to rule engine methods and systems for human-computing device interaction.

BACKGROUND

People frequently interact with and utilize machines to perform various tasks. For example, computers connected through internet have been serving as terminals for information exchange, goods purchase, etc. To promote their products, services, or ideas, content hosts usually have a great interest of attracting traffic to their websites, applications, or other portals. For the hosts, it is desirable to track and understand the mindsets of the users, based on which appropriate contents can be rendered at the right time and in the right form to induce positive responses. Nevertheless, existing technologies fall short in providing customizable systems and methods for such interactions. In most cases, only a universal solution is available, such as popping up a window ten second after opening a website, which users may find intrusive and unpleasing. Consequently, potential patrons may turn away, causing losses to the hosts.

SUMMARY

One aspect of the present disclosure is directed to a system for monitoring and stimulating user actions to contents retrieved from a network. The system may comprise an end-user computing device accessing the contents retrieved from the network, a set of configurable rules, a rules engine for applying the rules, and a remote server coupled to the end-user computing device and the network. The remote server may be configured to associate the end-user computing device to the rules engine and to at least one of the rules, determine at least one of a state of the server, an input at the server, a state of the end-user computing device, or an input at the end-user computing device each associated with at least a portion of the retrieved contents, and execute the associated at least one rule utilizing the associated rules engine to stimulate a user action from the end-user computing device.

Another aspect of the present disclosure is directed to a method for monitoring and stimulating user actions to contents retrieved from a network to an end-user computing device. The method may be performed by a remote server coupled to the end-user computing device and the network. The method may comprise associating the end-user computing device to at least one of a set of configurable rules and to a rules engine for applying the rules, determining at least one of a state of the server, an input at the server, a state of the end-user computing device, or an input at the end-user computing device each associated with at least a portion of the retrieved contents, and executing the associated at least one rule utilizing the associated rules engine to stimulate a user action from the end-user computing device.

Another aspect of the present disclosure is directed to a server for monitoring and stimulating user actions to contents retrieved from a network to an end-user computing device. The server may comprise a set of configurable rules and a rules engine for applying the rules. The server may be coupled to the end-user computing device and the network. The server may be configured to associate the end-user computing device to the rules engine and to at least one of the rules, determine at least one of a state of the server, an input at the server, a state of the end-user computing device, or an input at the end-user computing device each associated with at least a portion of the retrieved contents, and execute the associated at least one rule utilizing the associated rules engine to stimulate a user action from the end-user computing device.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this disclosure, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

Figure 1:
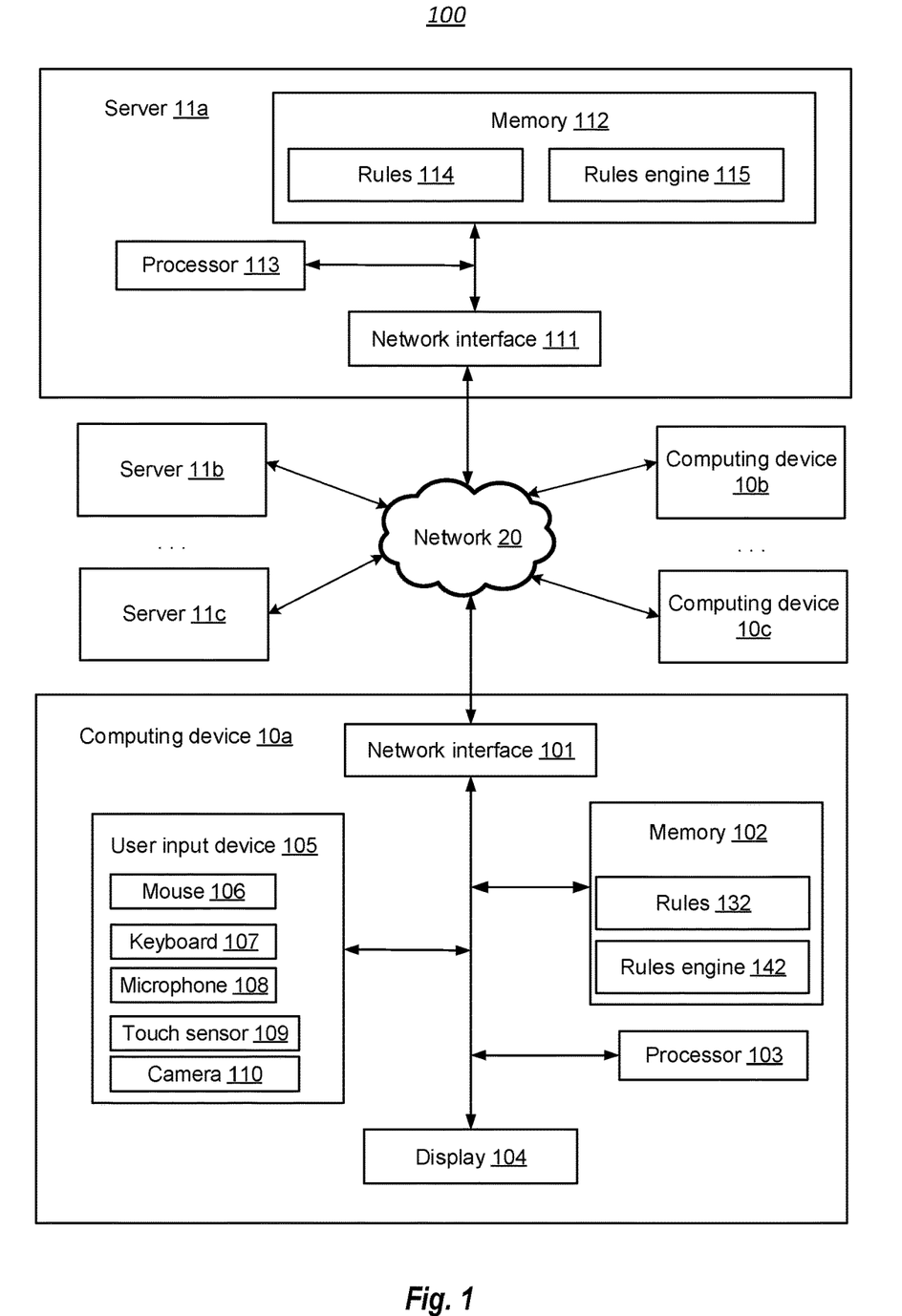
FIG. 1 is a block diagram illustrating a human-machine interaction system, consistent with exemplary embodiments of the present disclosure.

FIG. 1 is a block diagram illustrating a human-machine interaction system 100, consistent with exemplary embodiments of the present disclosure. The system 100 may also be referred to as a system for monitoring and stimulating user actions to contents retrieved from a network. The system 100 may include one or more servers (e.g., servers 11a, 11b, 11c, etc.) and one or more computing devices (e.g., computing devices 10a, 10b, 10c, etc.) coupled together through a network 20. The computing devices may have various embodiments, such as laptops, desktops, pads, e-readers, cellphones, wearable devices, Google Glasses, and the like. Some of the components shown in FIG. 1, such as the servers 11b and 11c and the computing devices 10b and 10c, may be optional. The network 20 may be any type of network, such as Internet (e.g., based on cables, optical fibers, or wireless connections), a nationwide cellular network, a local wireless network (e.g., Bluetooth™ or WiFi), or a wired network.

The servers may have various implementations. In some embodiments, the server 11*a* may comprise a network interface 111, a memory 112, and a processor 113, some of which may be optional. The network interface 111, the memory 112, and the processor 113 may be operatively connected to each other via a bus or other types of communication channels. In some embodiments, the server 11*a* may include many more components than those shown in FIG. 1. However, it is not necessary that all of these components be shown in order to disclose an illustrative embodiment. The servers 11*b* and 11*c* may be similar to the server 11*a*.

The network interface 111 may include connectors for wired communications, wireless transmitters and receivers, and/or wireless transceivers for wireless communications. The connectors, transmitters/receivers, or transceivers may be configured for two-way communication among the server 11, the other servers, and various computing devices. The network interface 111 may send and receive data via internet cables, communication cables, wireless networks, or other communication mediums.

The memory 112 may include transitory and/or non-transitory storage media or memories configured to store data, logic, code, and/or program instructions executable by the processor 113 for performing one or more routines or functions, and/or steps and methods disclosed herein. The memory 112 may include one or more memory units (e.g., flash memory card, random access memory (RAM), read-only memory (ROM), and the like). In some embodiments, inputs from the network interface 111 can be conveyed to and stored within the memory 112.

The processor 113 may include one or more processors, such as a programmable processor (e.g., a central processing unit (CPU)). The processor 113 may be configured perform one or more methods disclosed herein. In some embodiments, the memory 112 may store instructions including a set of configurable rules 114 and a rules engine 115 for applying the rules. When the processor 113 executes the instructions (e.g., according to the rules 114 and the rules engine 115), the processor 113 is configured to perform one or more method described herein. Although FIG. 1 depicts a single processor 113 and a single memory 112, one of skill in the art would appreciate that this is not intended to be limiting, and that the server 11*a* may include a plurality of processing units and/or memory units of the memory.

The rules 114 may include one or more configurable rules involving one or more parameters. In some embodiments, a rule may be executed based on the one or more parameters. One or more of the parameters may be inputs or states at the server-side (e.g., the server 11*a*, 11*b*, 11*c*, etc.) or client-side (the computing device 10*a*, 11*b*, 11*c*, etc.). There may be many types of parameters associated with the server or client side. For example, time duration, time stamp, geographic location, item information (e.g., item name, description, color, size, price, category, shipping method, shipping time, and related items), user information or corresponding classification (e.g., income level, home address, zip code, age, job, education, habit, cultural background, religion, purchase history, browse history, search history, user input), etc. Each parameter may be monitored as a state parameter or an input parameter.

The rules (e.g., the rules 114) may be created, defined, configured, modified, or otherwise controlled through the server 11*a* and/or a device coupled to the server 11*a*, such as the server 11*b*, the server 11*c*, the computing device 10*a*, the computing device 10*b*, or the computing device 10*c*. The rules may be defined by a user (e.g., via a rule authoring interface providing users options to achieve the control), an algorithm (e.g., a machine learning algorithm), etc. Each defined rule may comprise a logic condition associating the one or more parameters with assigned weights. The rules engine 115 may store, retrieve, display, configure, or apply the rules. For example, the rules engine 115 may present the one or more parameters to the server 11*a*-11*c*, the computing devices 10*a*-10*c*, or other terminal devices for users to configure the rules 114. A user, e.g., a merchant, an internet administrator, or a program, may define, configure, or modify the rules by linking the parameters with logic conjunctions, logic conditions, etc. For example, a defined rule associating time duration, time stamp, and user input may be: during day time (when users generally have less leisure time), displaying a discount code if a user browses an item for more than 5 second; and during night time (when users generally have more leisure time), displaying the discount code if a user browses an item for more than 10 second. For another example, a defined rule associating a location of a computing device and user input may be: displaying at a computing device an advertisement of a service provided in a region, only if the computing device is in the region. The location of the computing device may be determined by various methods such as global positioning and broadcast by the computing device. Thus, the rules engine allows the user to configure and apply a rule scheme.

Once defined, the rules can be transmitted, updated, or otherwise pushed from one device (e.g., any server, computing device, etc.) to one or more devices. Therefore, a rule may be created or defined by a first device and executed by the same or a different device. For example, one of the rules 114 to monitor inputs to a computing device may be created at the server 11*a*, pushed to a memory of the computing device 10*a*, and executed by a rules engine of the computing device 10*a* (e.g., rules engine 142 described below). Further, a defined rule can be disposed on and executed by one or more devices. For example, the rules engine 115 may execute one of the rules 114 to monitor inputs to a computing device and determine an output from the computing device and/or from another computing device. For another example, the rules engine 115 of the server 11*a* and another rules engine of the server 11*b* may jointly or severally execute one of the rules 114. For yet another example, the rules engine 115 of the server 11*a* and another rules engine of the computing device 10*a* (described below) may jointly or severally execute one of the rules 114. More examples are described below in conjunction with method implementations.

In some embodiments, the computing device 10*a* may comprise a network interface 101, a memory 102, a processor 103, a display 104, and a user input device 105, some of which may be optional. The network interface 101, the memory 102, the processor 103, the display 104, and the user input device 105 may be operatively connected to each other via a bus or other types of communication channels. In some embodiments, the computing device 10*a* may include many more components than those shown in FIG. 1. However, it is not necessary that all of these components be shown in order to disclose an illustrative embodiment. The computing devices 10*b* and 10*c* may be similar to the computing device 10*a*.

The network interface 101 may include connectors for wired communications, wireless transmitters and receivers, and/or wireless transceivers for wireless communications. The connectors, transmitters/receivers, or transceivers may be configured for two-way communication between the computing device 10*a* and other devices of the system 100. The network interface 101 may send and receive data via internet cables, communication cables, wireless networks, or other communication mediums.

The memory 102 may include transitory and/or non-transitory storage media or memories configured to store data, logic, code, and/or program instructions executable by the processor 103 for performing one or more routines or functions, and/or steps and methods disclosed herein. The memory 102 may include one or more memory units (e.g., flash memory card, random access memory (RAM), read-only memory (ROM), and the like). In some embodiments, inputs from the network interface 101 can be conveyed to and stored within the memory 102. The processor 103 may be configured perform one or more methods disclosed herein. For example, the processor 103 may be a central processing unit. Although FIG. 1 depicts a single processor 103 and a single memory 102, one of skill in the art would appreciate that this is not intended to be limiting, and that the computing device 10a may include a plurality of processing units and/or memory units of the memory.

The rules 114 and the rules engine 115 may be deployed on one or more computing devices of the system 100. In some embodiments, the memory 102 of the computing device 10a may comprise one or more rules 132 and a rules engine 142. The rules 132 may be comprise similar or different rules from the rules 114. For example, the rules 132 may be a copy of the rules 114, and the various copies of the rules 114 may be synced, so that any change from any copy will update other copies, or otherwise determined. In some embodiments, the rules 132 may be stored in a local cache of the memory 102 or a browser cookie. The rules engine 142 may be configured to perform similar functions as the rules engine 115, and accordingly the processor 103 may execute similar rules and/or perform one or more similar methods as the processor 113. Alternatively, the processor 103 and the processor 113 may together execute one or more rules to perform one or more methods described herein. Similarly, other computing devices may also carry similar rules and rules engine as the computing device 10a and perform similar functions. Therefore, the rules and/or methods described herein may be executed at a server side (e.g., the server 11a, 11b, 11c, etc.) and/or a computing device side (e.g., computing devices 10a, 10b, 10c, etc.).

The display 104 may be configured to provide visual data to a user. The visual data may be related to contents provided through internet. The visual data may be provided via a graphical user interface (e.g., a screen). The graphical user interface may be configured to receive user input, e.g., via a touch screen or via a normal screen coupled to a mouse. The user input may comprise instructions to manipulate, edit, or use the visual data.

The user input device 105 may comprise a mouse 106, a keyboard 107, a microphone 108, a touch screen 109, and a camera 110, some of which may be optional. Each of the user input device may be configured to capture a user input, e.g., a click or a screen cursor movement action through the mouse 106, a keyboard entry through the keyboard 107, a voice command through the microphone 108, a touch command through the touch screen 108, or a gesture command through the camera 110.

Figure 2:
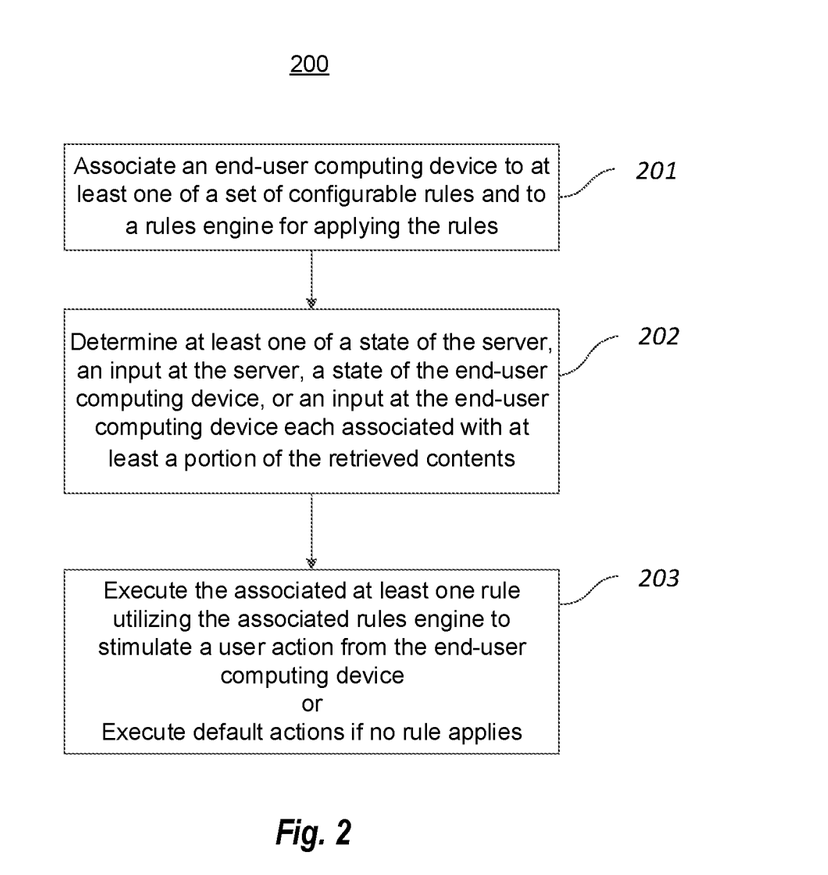
FIG. 2 is a flow diagram illustrating a human-machine interaction method, consistent with exemplary embodiments of the present disclosure.

FIG. 2 is a flow diagram illustrating a human-machine interaction method 200, consistent with exemplary embodiments of the present disclosure. The method 200 may comprise a number of steps, some of which may be optional or may be rearranged in another order. One or more steps of the method 200 may be implemented by one or more components of the system 100, e.g., one or more of the servers 11a, 11b, and 11c and/or one or more of the computing devices 10a, 10b, and 10c, or any other suitable system.

In some embodiments, the system 100 is a system for monitoring and stimulating user actions to contents retrieved from a network (e.g., contents retrieved from servers, computers, or similar devices or storage medium coupled through the network 20) and retrieved to an end-user computing device (e.g., computing device 10a). The system 100 may comprise an end-user computing device (e.g., the computing device 10a) accessing the contents retrieved from the network. A remote server (e.g., the server 11a) coupled to the end-user computing device and the network may be configured to perform one or more methods, e.g., method 200, disclosed in this disclosure.

At step 201, the processor 113 may associate an end-user computing device (e.g., the computing device 10a) to at least one of a set of configurable rules and to a rules engine for applying the rules. As described above, the server 11a may comprise the set of configurable rules and the rules engine. In some embodiments, the rules and the rules engine may be configured through the server 11a or a device coupled to the server 11a. The association may be performed by a user, an administrator, an algorithm, etc. The association may be unselective or selective based on various conditions, such as geographic location, time, user profile, or user action. For example, a certain rule may be associated with end-user computing devices with a certain IP address, in a certain geographic area, active during a certain time period, or associated with a certain account of a retailer. For another example, a certain rule may be associated with end-user computing devices that accessed or accessing a certain internet portal (e.g., website, application, and program). For yet another example, the server 11a may associate all (computing) devices that coupled to the server 11a to the set of rules.

At step 202, the processor 113 may determine at least one of a state of the server (e.g., a server-side counter state), an input at the server (e.g., a server-side rule change), a state of the end-user computing device (e.g., a client-side counter state), or an input at the end-user computing device (e.g., a client-side keyboard entry) each associated with at least a portion of the retrieved contents. The association may comprise loose connections, for example, an activity at an end-user computing device may be considered associated with the contents previously rendered at the computing device in the scope of this disclosure. For example, step 202 may comprise step 311 of method 310 or step 401 of method 400 described below.

At step 203, the processor 113 may execute the associated at least one rule utilizing the associated rules engine to stimulate a user action from the end-user computing device. Alternatively, the processor 113 may cause the processor 103 to execute the associated at least one rule utilizing the associated rules engine to stimulate a user action from the end-user computing device. Step 203 may be executed if the determined action matches with a condition defined in the rules; otherwise, default actions may be executed (e.g., doing nothing). For example, step 203 may comprise steps 312 and 313 of method 310 or steps 401 and 402 of method 400 described below. The stimulated action from the end-user computing device may include, for example, completing a transaction by purchasing the item, triggering a link, completing a survey, etc.

At step 203, the processor 113 may execute a default action if no appropriate rule applies. The default action may comprise performing no action, showing a generic content, etc.

In some embodiments, the steps 202 and 203 may be performed by one or more servers alone, one or more end-user computing devices alone, or a combination thereof. As described above with reference to FIG. 1, the rules described herein can be stored on a computing device, thus, a computing device (e.g., the computing device 10a) may independently determine a state of the server, an input at the server, a state of itself, and/or an input at itself and execute the associated at least one rule utilizing its rules engine (e.g., the rules engine 142) to stimulate a user action from itself.

Figure 3A:
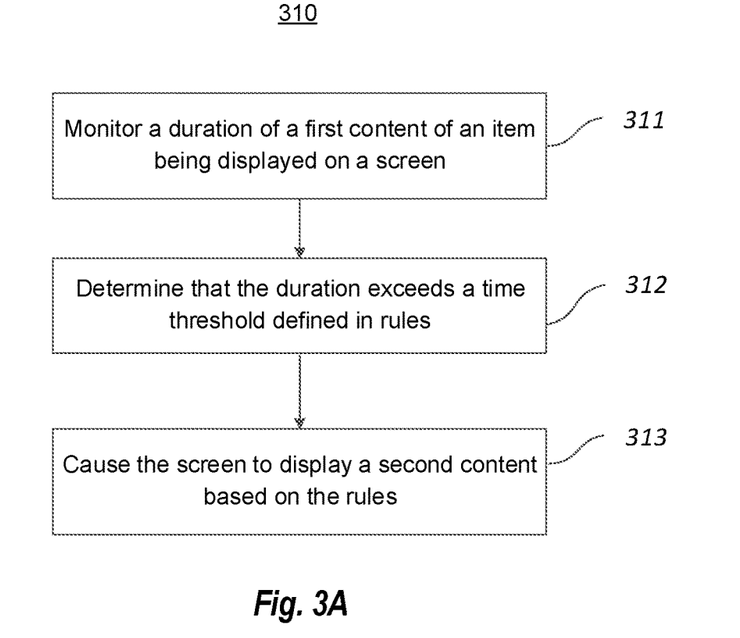
FIG. 3A is a flow diagram illustrating a human-machine interaction method, consistent with exemplary embodiments of the present disclosure.

FIG. 3A is a flow diagram illustrating a human-machine interaction method 310, consistent with exemplary embodiments of the present disclosure. The method 310 may comprise a number of steps, some of which may be optional or may be rearranged in another order. One or more steps of the method 310 may be implemented by one or more components of the system 100 or any other suitable system. The processor 113 may monitor and/or control operations of one or more components of the computing device 10a directly or via the processor 103.

At step 311, the processor 113 may monitor a duration of a first content of an item being displayed on a screen (e.g., the display 104). The first content of the item may include any information displayed on the screen regarding a good, a merchandise, a product, a service, or other items. The retrieved contents described above may comprise the first content. The first content may be displayed in any form, such as a text description, a clip, a sound track, a video, an image, an animation, etc. The first content may be a story, an offer, an advertisement, a promotion, a listing, etc. In one example, the first content may be a product offered for sale on an e-commerce website. The processor 113 may analyze the first content and compare it with the rules 114 (e.g., various parameters of in the rules 114). The processor 113 may determine that the first content has been configured by the rules engine 115 and incorporated in the rules 114, and thus monitor the duration.

The duration of display may be monitored by various methods. The duration may be a parameter configured by the rules engine 115 to incorporate in the rules 114. The duration may be determined continuously or cumulatively. For example of the continuous determination, the duration may end with the first content ceasing to display on the screen, e.g., when a window of the first content is closed, minimized, or tabbed out, the first content is scrolled out of the screen, etc. Alternatively, the duration may be determined cumulatively by aggregating a total time of displaying the first content, regardless of any interruption such as ceasing the display. The cumulative determination may include aggregating time from different devices based on user identification. For example, if a registered user browses the same item from the computing devices 10a and 10b, the total browsing time on both devices may be determined as the duration. In some embodiments, a user may also define the "display" via the rules engine 115. For example, the user may define an item on a tabbed-out but still open page as "displaying" on the screen, or otherwise.

To monitor the duration of the first content, the processor 113 may monitor activities of at least one of the mouse 106, the keyboard 107, the microphone 108, the touch sensor 109, the camera 110, or the display 104. For example, if the mouse 106 registers a click directed to a certain link of the item, the processor 113 may determine a beginning of the duration; if the touch screen 109 registers a closing command of a window displaying the first content, the processor 113 may determine an end of the duration.

In some embodiments, the processor 113 may monitor one or more other parameters of the first content displayed on the screen, such as identity (e.g., if the displayed item is food), time (e.g., if the first item is displayed during weekend or lunch hours), frequency (e.g., how many times has the information of the item been retrieved or displayed), item price, etc. The parameters to monitor may be determined by the rules engine 115 to incorporate in the rules 114.

At step 312, the processor 113 may determine that the duration exceeds a time threshold defined in rules (e.g., rules 114). The time threshold may be configured by a user.

At step 313, the processor 113 may cause the screen to display a second content based on the rules. The second content may be associated with the same item in the step 311 or unrelated to the first content.

In some embodiments, a user may have defined the rules 114 in the rules engine 115 that when the duration exceeds the time threshold, display the second content, and this defined rule is executable by the processor 113. In this rule, the "duration," the "time threshold," and the "second content" may be parameters chosen by the user. The user may also define contents of the "time threshold" and the "second content." Other rules of the rules 114 may be similarly implemented by the processor 113. For example, another rule may be displaying the second content when the monitored identity, time, frequency, or another parameter fulfills a condition, e.g., exceeding or falling under a threshold. The condition defined in the rules may depend on multiple conditions and/or multiple parameters.

In some embodiments, the second content may be configured by a user in the rules engine 115. For example, the second content may be related to the item in the first content. The second content may comprise a promotion, a coupon, or a discount of the item in the first content or of another item related to the item in the first content. In one example, the item is a cellphone displayed in the first content, and the second content is a discount of the cellphone or a discount of a cellphone case for that cellphone. For another example, the second content may be unrelated to the item. In one example, the item is a cellphone displayed as the first content, and the second content is an offer of free movie tickets.

In some embodiments, the selection of second contents and display methods can be configured by a user in the rules engine 115. For example, the user may have several second contents that can be shown at the step 313 and each has a target viewership distribution. A target viewership distribution can be a target number of information display, a target area of information display, a target viewer distribution percentage, etc. Accordingly, the user may preset the viewership distribution for each of the second contents and incorporate into the rule for showing the second contents. Before the rule at the step 313 is to be executed on various computing devices coupled to a server, the computing devices may check the input and/or state of the memory of the server and/or the computing devices themselves to determine a current viewership distribution of the second contents (e.g., checking at the server-side how many times each second content has been shown and if the target viewership has been reached) and determine to show the second content that has not met its target viewership distribution.

By method 310, a content host, such as an e-commerce merchant, may utilize the rules engine to monitor user behavior on the website, application, or other online portal. Based on the monitoring, appropriate techniques can be used to stimulate a desirable user performance. For example, if it is determined that the user is interested in a certain product, e.g., based on the time spent on the product page, the content host may incentivize a transaction by offering a promotion. Similarly, other rules can be defined to trigger various actions in response to determining certain user behavior.

Figure 3B:
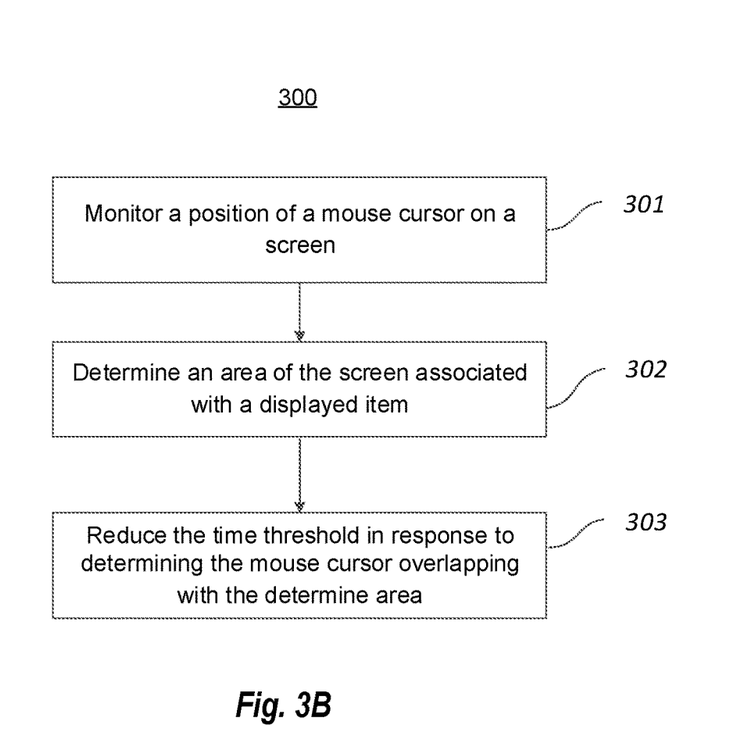
FIG. 3B is a flow diagram illustrating a human-machine interaction method, consistent with exemplary embodiments of the present disclosure.

FIG. 3B is a flow diagram illustrating a human-machine interaction method 300, consistent with exemplary embodiments of the present disclosure. The method 300 may comprise a number of steps, some of which may be optional or may be rearranged in another order. One or more steps of the method 300 may be implemented by one or more components of the system 100 or any other suitable system. In some embodiments, the method 300 may be implemented to perform the step 311 described above.

At step 301, the processor 113 may monitor a position of the mouse cursor on the screen.

At step 302, the processor 113 may determine an area of the screen associated with the displayed item. For example, if the item is display on or associated with a certain background image, the background image as displayed on the screen may be determined as the area associated with the displayed item. The determined area of the screen may change with user operations, such as scrolling down a page, or switching to another tab.

At step 303, the processor 113 may reduce the time threshold in response to determining that the position of the mouse cursor is within the determined area. For example, if the processor 113 determines that the mouse cursor overlaps with the determined area instantly or for over a time period, the processor 113 may reduce the time threshold of the step 312. As a result, the second content may be caused to display earlier at the step 313. Since the determined overlap may indicate substantial interest or at least some recognition of the displayed item, displaying the second content earlier may induce more interest or a purchase decision.

Alternatively, to monitor the duration of the first content, the processor 113 may monitor an input from the keyboard 107, and reduce the time threshold in response to determining the input matching with a description of the item. As shown, based on the monitoring, appropriate techniques can be used to stimulate a desirable user performance. For example, if a user views the first content of the item and tries to google for more information by typing the item name in Google Search, that action may show substantial interest of the item. At this point, it may be appropriate to display the second content before the "Search" is executed. This method may encourage a purchase decision or transaction and avoid getting competing sellers' information into the user's decision making process, since the user may switch to or at least consider competitor offers returned by the Google Search.

Figure 4:
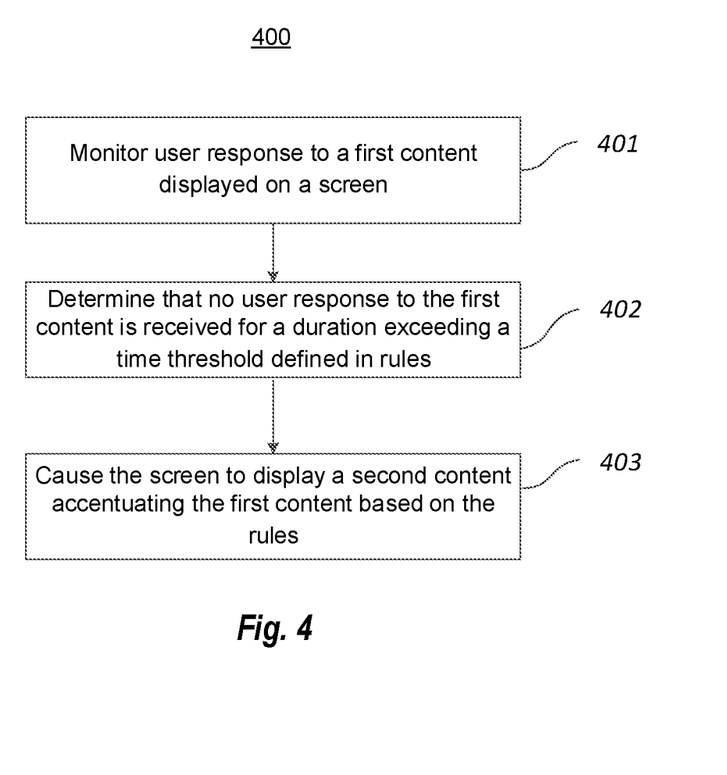
FIG. 4 is a flow diagram illustrating a human-machine interaction method, consistent with exemplary embodiments of the present disclosure.

FIG. 4 is a flow diagram illustrating a human-machine interaction method 400, consistent with exemplary embodiments of the present disclosure. The method 400 may comprise a number of steps, some of which may be optional or may be rearranged in another order. One or more steps of the method 400 may be implemented by one or more components of the system 100 or any other suitable system.

At step 401, the processor 113 may monitor user response to a first content displayed on a screen (e.g., the display 104). The first content may be configured by the rules engine 115 to incorporate in the rules 114. The retrieved contents described above may comprise the first content. The first content here may or may not be similar to the first content of step 311 described above.

At step 402, the processor 113 may determine that no user response to the first content is received for a duration exceeding a time threshold defined in the rules. For example, in the rules 114, it may have been defined that when receiving a response to the first content, a processor records the response and transmits the response to a server. The processor 113 may monitor the activity of at least one of the mouse 106, the keyboard 107, the microphone 108, the touch sensor 109, the camera 110, or the display 104, to determine if any user response is received. The time threshold and the user response may be defined in the rules 114. For example, if the mouse 106 receives a click on the displayed item, the processor 113 may determine that a user response is received; if the mouse 106 receives a click on an unrelated application, the processor 113 may determine that the click action is not a user response to the first content; if the camera 110 captures that the user is away from the computing device 10a, the processor 113 may determine that no response to the first content is received.

In some embodiments, user responses from different devices may be collectively determined based on user identification. For example, if a registered user views the same item from computing devices 10a and 10b, his responses to the item from both computing devices may be determined collectively and cumulatively as one response in step 401 and step 402.

At step 403, the processor 113 may cause the screen to display a second content accentuating the first content based on the rules. The second content here may or may not be similar to the second content of step 313 described above.

As shown, based on the monitoring, appropriate techniques can be used to stimulate a desirable user performance. In some embodiments, the first content of step 401 may be an icon indicating a survey/feedback request and providing a link for users to click. For example, the icon may be a flower with a title "Survey." According to the rule, if no user response is received past the time threshold, the second content may be displayed as an animation (e.g., a bee flying around the flower icon) to draw user's attention to the Survey. That is, the second content may augment on first content. Thus, user attention can be captured, and the chance for receiving the survey response is improved. Compared with traditional methods such as popping up a window to solicit survey answers, the disclosed method is uninstructive and unlikely to annoy the user. The second content may disappear after a configurable period of time to restore the first content. This feature may ensure that the user is not bothered by the second content for too long, if not interested in responding to the first content.

In some embodiments, the processor 113 may analyze responses to the survey/feedback, such as by integrating the responses with Google Analytics or similar tools to provide a 360 degree analysis platform. The integrated results may be presented to the computing device 10c where a user can study the relation between internet traffic and the user feedback to a certain website, product, or portal. The results can help administrators to identify links between problems suggested in the feedback and the internet traffic to their portals, and make appropriate improvements, the feature of which is not available in current analytics tools such as the Google Analytics.

A person skilled in the art can further understand that, various exemplary logic blocks, modules, circuits, and algorithm steps described with reference to the disclosure herein may be implemented as specialized electronic hardware, computer software, or a combination of electronic hardware and computer software. For examples, the modules/units may be implemented by one or more processors to cause the one or more processors to become one or more special purpose processors to executing software instructions stored in the computer-readable storage medium to perform the specialized functions of the modules/units.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more tangible and/or non-transitory computer-readable storage media containing computer-readable program codes. Common forms of non-transitory computer readable storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a computer, an embedded processor, or other programmable data processing devices to produce a special purpose machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions (which are executed on the computer or other programmable devices) provide steps for implementing the functions specified in one or more flows in the flow diagrams and/or one or more blocks in the block diagrams. In a typical configuration, a computer device includes one or more Central Processors (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage can be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The specification has described attention monitoring methods, apparatus, and systems for human-machine interaction. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A system for monitoring and stimulating user actions to contents retrieved from a network, the system comprising:
    a server, wherein the server comprises a non-transitory computer-readable memory storing instructions including:
        a set of configurable rules; and
        a rules engine for applying the rules,
    wherein the server is coupled to a plurality of end-user computing devices and the network, the server associating one end-user computing device of the plurality of end-user computing devices to the rules engine and to at least one of the rules, determining at least one of a state of the server, an input at the server, a state of the one end-user computing device, or an input at the one end-user computing device each associated with at least a portion of the retrieved contents, and executing the associated at least one rule utilizing the associated rules engine to stimulate a user action from the one end-user computing device, wherein, when the server executes the instructions, the instructions cause the server to:
        monitor a duration of a first content of an item being displayed on the plurality of end-user computing devices to a same registered user, wherein the first content is displayed on a background image on at least two of the plurality of end-user computing devices to the same registered user, the retrieved contents comprising the first content, and the duration of the first content of the item being displayed is an aggregation of a time of the first content displayed on each of the at least two of the plurality of end-user computing devices to the same registered user;
        determine whether the duration exceeds a time threshold defined in the rules for displaying a second content of the item;
        determine a target viewership distribution for each of a plurality of second contents, wherein each of the plurality of second contents includes a promotion of the item, and each of the target viewership distributions is one of a target number of display, a target area of display, and a target viewer distribution percentage for the corresponding second content;
        select one of the plurality of second contents that has not met its target viewership distribution as a selected second content; and
        cause, in response to a determination that the duration exceeds the time threshold, a screen of the one end-user computing device to display the selected second content of the item based on the rules,
    wherein to monitor the duration of the first content, the server is configured to:
        determine the background image the first content is displayed on;
        monitor a position of a cursor of a mouse of the one end-user computing device; and
        automatically reduce, in response to determining that the position of the cursor is within the background image, the time threshold for displaying the second content of the item.

2. The system of claim 1, wherein:
    each of the rules is a logic condition associating one or more parameters;
    each of the rules is configurable through at least one of the server or a device coupled to the server; and
    the one or more parameters include at least one of time duration, time stamp, geographic location, item information, or user information.

3. The system of claim 1, wherein to monitor the duration of the first content, the server is configured to:
    determine an input from a keyboard of the one end-user computing device; and reduce, in response to determining that the input matches a description of the item, the time threshold.

4. The system of claim 1, wherein, when the server executes the instructions, the instructions further cause the server to:
    monitor a user response to the first content displayed on the screen of the one end-user computing device;
    determine whether no user response to the first content is received for a duration exceeding the time threshold; and
    cause, in response to a determination that no user response to the first content is received for a duration exceeding the time threshold, the screen of the one end-user computing device to display a content accentuating the first content based on the rules.

5. The system of claim 4, wherein the server is configured to augment the content accentuating the first content on the first content.

6. A method for monitoring and stimulating user actions to contents retrieved from a network to one end-user computing device of a plurality of end-user computing devices, performed by a server coupled to the plurality of end-user computing devices and the network, the method comprising:
    associating the one end-user computing device of the plurality of end-user computing devices to at least one of a set of configurable rules and to a rules engine for applying the rules;
    determining at least one of a state of the server, an input at the server, a state of the one end-user computing device, or an input at the one end-user computing device each associated with at least a portion of the retrieved contents; and
    executing the associated at least one rule utilizing the associated rules engine to stimulate a user action from the one end-user computing device, wherein determining at least one of a state of the server, an input at the server, a state of the one end-user computing device, or an input at the one end-user computing device comprises:
monitoring a duration of a first content of an item being displayed on the plurality of end-user computing devices to a same registered user, wherein the first content is displayed on a background image on at least two of the plurality of end-user computing devices to the same registered user, the retrieved contents comprising the first content, and the duration of the first content of the item being displayed is an aggregation of a time of the first content displayed on each of the at least two of the plurality of end-user computing devices to the same registered user, and
wherein executing the associated at least one rule utilizing the associated rules engine to stimulate a user action comprises:
determining whether the duration exceeds a time threshold for displaying a second content of the item defined in a set of configurable rules associated with a rules engine;
determining a target viewership distribution for each of a plurality of second contents, wherein each of the plurality of second contents includes a promotion of the item, and each of the target viewership distributions is one of a target number of display, a target area of display, and a target viewer distribution percentage for the corresponding second content;
selecting one of the plurality of second contents that has not met its target viewership distribution as a selected second content; and
causing, in response to a determination that the duration exceeds the time threshold, a screen of the one end-user computing device to display the selected second content of the item based on the rules,
wherein monitoring the duration of the first content comprises:
determining the background image the first content is displayed on;
monitoring a position of a cursor of a mouse of the one end-user computing device; and
automatically reducing, in response to determining that the position of the cursor is within the background image, the time threshold for displaying the second content of the item.

7. The method of claim 6, wherein:
each of the rules is a logic condition associating one or more parameters;
each of the rules is configurable through at least one of the server or a device coupled to the server; and
the one or more parameters include at least one of time duration, time stamp, geographic location, item information, or user information.

8. The method of claim 6, wherein monitoring the duration of the first content comprises:
determining an input from a keyboard of the one end-user computing device; and
reducing, in response to determining that the input matches a description of the item, the time threshold.

9. The method of claim 6, wherein:
determining at least one of a state of the server, an input at the server, a state of the one end-user computing device, or an input at the one end-user computing device comprises:
monitoring a user response to the first content displayed on the screen of the one end-user computing device, and
wherein executing the associated at least one rule utilizing the associated rules engine to stimulate a user action comprises:
determining whether no user response to the first content is received for a duration exceeding the time threshold; and
causing, in response to a determination that no user response to the first content is received for a duration exceeding the time threshold, the screen of the one end-user computing device to display a content accentuating the first content based on the rules.

10. The method of claim 9, wherein the content accentuating the first content is augmented on the first content.

* * * * *